(12) United States Patent
Husemann et al.

(10) Patent No.: US 6,765,078 B2
(45) Date of Patent: Jul. 20, 2004

(54) METHOD FOR PRODUCING POLYACRYLATES

(75) Inventors: Marc Husemann, Hamburg (DE); Stephan Zöllner, Hamburg (DE); Martin Losch, Plön (DE)

(73) Assignee: tesa AG, Hamburg (DE)

(*) Notice: Subject to any disclaimer, the term of this patent is extended or adjusted under 35 U.S.C. 154(b) by 0 days.

(21) Appl. No.: 10/129,942

(22) PCT Filed: Jun. 15, 2001

(86) PCT No.: PCT/EP01/06734
§ 371 (c)(1),
(2), (4) Date: May 10, 2002

(87) PCT Pub. No.: WO01/98383
PCT Pub. Date: Dec. 27, 2001

(65) Prior Publication Data
US 2002/0193539 A1 Dec. 19, 2002

(30) Foreign Application Priority Data
Jun. 20, 2000 (DE) .......................... 100 30 217

(51) Int. Cl.⁷ ............................................. C08F 118/02
(52) U.S. Cl. .................... 526/319; 526/219.6; 526/227; 526/229; 526/309; 526/323.2; 526/328.5
(58) Field of Search ............................. 526/319, 219.6, 526/227, 229, 309, 323.2, 328.5

(56) References Cited

U.S. PATENT DOCUMENTS

| | | | | |
|---|---|---|---|---|
| 3,983,057 A | | 9/1976 | Illmann et al. | 260/29.6 |
| 5,073,611 A | | 12/1991 | Rehmer et al. | 526/208 |
| 5,489,642 A | | 2/1996 | Gleichenhagen et al. | 524/504 |
| 5,547,562 A | * | 8/1996 | Grewal et al. | 208/24 |
| 5,575,954 A | * | 11/1996 | Mahabadi et al. | 252/511 |
| 5,866,047 A | | 2/1999 | Nagino et al. | 264/1.27 |
| 6,448,354 B1 | * | 9/2002 | Hieda et al. | 526/319 |

FOREIGN PATENT DOCUMENTS

| | | | | |
|---|---|---|---|---|
| DE | 43 40 297 A1 | 6/1995 | ............ | C09J/151/06 |
| EP | 0 621 326 B1 | 10/1994 | ............ | C09J/7/02 |
| EP | 0 971 010 A1 | 1/2000 | ............ | C09J/201/00 |
| FR | 2 249 898 | 5/1975 | ............ | C08F/2/24 |
| FR | 2 715 653 | 8/1995 | ............ | C07D/211/66 |
| WO | WO 98/01478 | 1/1998 | ............ | C08F/2/38 |
| WO | WO 99/31144 | 6/1999 | ............ | C08F/2/38 |

OTHER PUBLICATIONS

CA 133:322211 (Abst. for ACS Symp. Ser. (2000), 768 (Controlled/Living Radical Polymerization), 278–296.
CA 132:166610 (Abst. for J. Appl. Polym. Sci. (2000), 75 (7), 938–944.
CA 131:133425 (Abst. for Macromolecules (1999), 32 (21), 6977–6980.
CA 129:189728 (Abst. for Macromolecules (1998), 31 (16), 5559–5562.
CA 122:82163 (Abst. for Eur. Polym. J. (1995), 31 (1), 67–78.

\* cited by examiner

Primary Examiner—Tatyana Zalukaeva
(74) Attorney, Agent, or Firm—Norris McLaughlin & Marcus PA

(57) ABSTRACT

A process for preparing polyacrylates, characterized in that the monomer mixture for preparing the polyacrylates is composed of at least 70% by weight of at least one acrylic monomer of the general formula

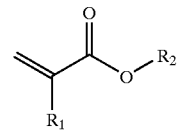

where $R_1$ is H or $CH_3$ and $R_2$ is H or an alkyl chain having 1–20 carbon atoms, the monomers are polymerized in the presence of at least one free-radical initiator by free-radical polymerization with at least one thioester as polymerization regulator, the average molecular weight of the polyacrylates is in the range from 250,000 g/mol to 1,000,000 g/mol, and the molecular weight distribution of the polyacrylates, $M_w/M_n$, is <4.

9 Claims, No Drawings

METHOD FOR PRODUCING POLYACRYLATES

The invention relates to a process for preparing polyacrylates having an average molecular weight of between 250,000 g/mol and 1,000,000 g/mol and a narrow molecular weight distribution.

Owing to ongoing technological developments in the coating process, there is a continuing demand for new developments in the field of pressure sensitive adhesives (PSAs). In industry, hotmelt processes with solvent-free coating technology for preparing PSAs are of growing significance, since the environmental strictures are becoming ever greater and the prices of solvents are rising. Hotmelt processes are already state of the art for SIS adhesives. In contrast, acrylic PSAs are still processed largely from solution. In this respect, an excessive average molecular weight continues to present problems, since, although it is essential for high shear strength, it causes a sharp rise in the flow viscosity, so that acrylic hotmelts with an average molecular weight of >1,000,000 g/mol are difficult to process from the melt.

On the other hand, low molecular weight acrylic hotmelts have already been successfully implemented as hotmelt PSAs (BASF AG, e.g. UV 203 AC resins). Here, benzophenone derivatives or acetophenone derivatives are incorporated as acrylated photoinitiators into the acrylic polymer chain and then crosslinked with UV radiation [U.S. Pat. No. 5,073,611]. Nevertheless, the obtainable shear strength with such systems is still not satisfactory, although as a result of the low average molecular weight ($\approx$250,000 g/mol) the flow viscosity is relatively low.

The preparation of relatively high molecular weight acrylic PSAs (average molecular weight between 250,000 g/mol and 1,000,000 g/mol) requires specific polymerization processes. Polymerization cannot be carried out without solvent, since at a certain point in time the flow viscosity becomes too high and the conversion of the reaction is very low. The residual monomers would disrupt the hotmelt process. Consequently, acrylic monomers are polymerized conventionally in solution and then concentrated in a concentrating extruder [EP 0621 326 B1].

Nevertheless, the concentration of this acrylic PSA causes problems, since for environmental reasons solvent mixtures, such as special boiling point spirits and acetone, for example, are frequently used (state of the art). Toluene is suspected of being carcinogenic and is therefore no longer utilized. A mixture of solvents leads to the absence of a continuous boiling point in the concentration process, with the consequence that it is very difficult to remove the solvent to a fraction of less than 0.5% (percent by weight based on the polymer). Attempts are therefore made to polymerize acrylates in only one solvent and with one regulator. The regulator meets the functions of avoiding gelling, lowering the average molecular weight, absorbing the heat given off in the initiation phase, lowering the molecular weight distribution, and yet ensuring a high conversion.

The regulators used are generally thiols, alcohols or halides, such as carbon tetrabromide, for example [cf., for example, H.-G. Elias, "Makromoleküle", Hüthig & Wepf Verlag, Basle, 5th Edition, 1990]. The use of halide regulators is decreasing persistently, however, on environmental grounds. Thiols and alcohols are suitable as regulators and, depending on concentration, greatly reduce the average molecular weight of the polymer but lead to a marked broadening of the molecular weight distribution. This is undesirable for acrylic PSAs, since polyacrylates with too low a molecular weight sharply reduce the cohesion and polyacrylates with a very high molecular weight make the melt viscosity a hindering factor in processing as a hotmelt.

In recent years, in contrast, a new polymerization process has been developed which makes it possible to prepare a large number of polymers with a very narrow molecular weight distribution (Macromolecules, 1999, 32, 5457–5459; WO 98/01478). The polymers described therein, however, all have a low average molecular weight (<200,000 g/mol). Moreover, in all cases the conversion is well below 90%. Both the residual monomer fraction and the low average molecular weight rule out use in the hotmelt process and use as PSAs.

It is an object of the invention to provide a process for preparing polyacrylate compositions of sufficiently high average molecular weights to be used as pressure sensitive adhesives, yet retaining the capacity for the processing of the hotmelt process, by achieving high conversion in the polymerization with a narrow molecular weight distribution.

This object is achieved, surprisingly and unforeseeably for the skilled worker, by a process as described in the main claim. The subclaims describe further developments of said process and applications of the polyacrylates prepared by said process.

Claim 1 relates accordingly to a process for preparing polyacrylates wherein the monomer mixture for preparing the polyacrylates is composed of at least 70% by weight of at least one acrylic monomer of the general formula

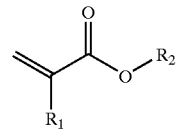

where $R_1$ is H or $CH_3$ and $R_2$ is H or an alkyl chain having 1–20 carbon atoms, the monomers are polymerized in the presence of at least one free-radical initiator by free-radical polymerization with at least one thioester as polymerization regulator, and the polymerization is conducted such that the average molecular weight of the polyacrylates is in the range from 250,000 g/mol to 1,000,000 g/mol, and the molecular weight distribution, $M_w/M_n$, is <4.

As free-radical initiators for the free-radical polymerization it is possible to use any customary initiators known for this purpose for acrylates. The preparation of C-centered radicals is described in Houben Weyl, Methoden der Organischen Chemie, Vol. E 19a, pp. 60–147. These methods may be employed analogously. Examples of radical sources are peroxides, hydroperoxides, and azo compounds; as non-exclusive examples of typical radical initiators mention may be made here of potassium peroxodisulfate, dibenzoyl peroxide, cumin hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. In one very preferred variant, the initiators are added in a number of stages, so that the conversion is increased to more than 90%. The residual monomer content of the polymer can in this way be decreased to below 10% by weight; by virtue of a low residual monomer content, the properties of the polyacrylate are considerably improved in respect of its further processing by the hotmelt process.

The initiators added at the beginning are preferably chosen for their low propensity to form side chains in the polymers; their grafting activity is preferably below a level of $\epsilon$<5 at the temperature of the reaction mixture when the initiator is added.

The absolute grafting activity (crosslink efficiency) is defined as the number of chemical side chains formed per 100 mol units of decomposed initiator. In analogy to van Drumpt and Oosterwijk [Journal of Polymer Science, Polymer Chemistry Edition 14 (1976) 1495–1511], it is possible to specify a value for this number by determining the dimers in a defined solution of the initiator; see also DE 43 40 297 A1:

A precisely 0.1 molar solution of the initiator is decomposed in n-pentadecane under an He atmosphere. The reaction time is chosen to correspond to ten times the half life of the respective initiator at the chosen temperature. This ensures virtually complete decomposition of the initiator. Subsequently, the fraction of dimeric pentadecane produced is measured by means of GLC. The percentage fraction $\epsilon$ is stated as a measure of the grafting activity. The reaction temperature is normally chosen so that the half life of the test initiator at this temperature is 15 minutes.

High $\epsilon$ values for the grafting activity imply a high propensity of the initiator to form side chains in the polymerization, whereas small $\epsilon$ values result in preferentially linear polymers.

In one preferred procedure, the process sequence is as follows:
- the reaction solution used is an at least 50% strength solution of the monomers with added initiator(s) and thioester(s),
- the free-radical polymerization is conducted within a temperature range from 50° C. to 90° C.,
- during the polymerization the batch is reinitiated at least once using a free-radical polymerization initiator with a low propensity to form side chains (grafting activity $\epsilon<5$ at the prevailing reaction temperature),
- if desired, the reaction is controlled by diluting the reaction solution according to the viscosity of the polymer,
- controlled reinitiation is carried out with up to 2% by weight, based on the monomer mixture, of an initiator with an increased propensity to form side chains (grafting activity $\epsilon>10$ at the prevailing reaction temperature), and
- the polymerization is conducted to a conversion >90%, preferably >95%.

Preferred initiators having a low $\epsilon$ value ($\epsilon<5$) are those whose radicals, owing to their low energy content, cause infrequent, if any, abstraction of hydrogen from the polymer chains. It is preferred here to use, for example, azo initiators such as azoisobutyrodinitrile or derivatives thereof, such as 2,2-azobis(2-methylbutyronitrile) (Vazo67, DuPont).

Initiators having a high side-chain formation propensity (high $\epsilon$ value >10) give high grafting yields even at relatively low temperatures. Particular preference is given here to using bis(4-t-butylcyclohexyl) peroxodicarbonate (Perkadox 16, Akzo Chemie), dibenzoyl peroxide or the like.

The polymerization may be conducted in the presence of an organic solvent or in the presence of water or in mixtures of organic solvents and/or water. As solvents for the polymerization it is possible to use all solvents which are suitable or commonly used for free-radical polymerizations, with acetone, ethyl acetate, petroleum spirit, toluene or any mixtures of these solvents being particularly appropriate.

It is preferred to use as little solvent as possible. Depending on conversion, temperature, and initiation, the polymerization time is between 6 and 48 h.

The pressure sensitively adhesive polyacrylates prepared have an average molecular weight of between 250,000 and 1,000,000 g/mol, said average molecular weight being measured by means of SEC or GPC. The (co)polymers prepared generally possess a lower molecular weight distribution than in the polymerizations conducted analogously using conventional regulators. The polydispersity may be reduced to a level of less than 4. As result of the low molecular weight distribution, there is a reduction in the flow viscosity of the pressure sensitive adhesive, and the hotmelt PSA is significantly easier to process as a hotmelt (lower melting temperature required, higher throughput for concentration).

In one particularly preferred variant of the inventive process, the thioesters used comprise compounds of the following general structural formula:

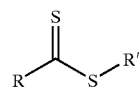

where R and R' are chosen independently of one another and R is a radical from one of groups i) to iv) and R' is a radical from one of groups i) to iii):

i) $C_1$–$C_{18}$ alkyl, $C_2$–$C_{18}$ alkenyl, $C_2$–$C_{18}$ alkynyl, in each case linear or branched; aryl, phenyl, benzyl, aliphatic and aromatic heterocycles, ii) —$NH_2$, —NH—$R^1$, —$NR^1R^2$, —NH—C(O)—$R^1$, —$NR^1$—C(O)—$R^2$, —NH—C(S)—$R^1$—C(S)—$R^2$,

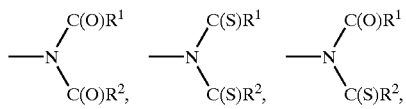

where $R^1$ and $R^2$ are independently chosen radicals from group i), iii) —S—$R^3$, —S—C(S)—$R^3$, where $R^3$ is a radical chosen from one of groups i) and ii), iv) —O—$R^3$, —O—C(O)—$R^3$, where $R^3$ is a radical chosen from one of groups i) and ii).

As regulators it is preferred, accordingly, to use dithioesters and trithiocarbonates.

As a result of the process thus chosen, it is possible very effectively to prepare the pressure sensitive adhesives having the desired PSA properties.

In one advantageous embodiment of the inventive process, the monomers used further comprise vinyl compounds with a fraction of up to 30% by weight, in particular one or more vinyl compounds chosen from the following group:

vinyl esters, vinyl halides, vinylidene halides, nitriles of ethylenically unsaturated hydrocarbons.

As examples of such vinyl compound mention may be made here of vinyl acetate, N-vinylformamide, vinylpyridines, acrylamides, acrylic acid, ethyl vinyl ether, vinyl chloride, vinylidene chloride, acrylonitrile, maleic anhydride, and styrene, without wishing this list to represent any unnecessary restriction. It is also possible to use all further vinyl compounds which fall within the group indicated above, and also all other vinyl compounds which do not fall into one of the classes of compound mentioned above.

In one very preferred procedure, the initiators which are added at the beginning to the monomer solution in the inventive process are those with a low propensity to form side chains (grafting activity $\epsilon<5$ at the prevailing temperature of the reaction solution). The initiators are preferably used in a fraction of 0.001–1% by weight, more preferably of 0.05% by weight, based on the monomer mixture.

In a further advantageous variant of the inventive process, the thioester is used with a weight fraction of 0.001%–5%, in particular from 0.025% to 0.25%. In the sense of the invention it is also very advantageous if the molar ratio of free-radical initiator to thioester is in the range from 50:1 to 1:1, in particular between 10:1 and 2:1.

For the use of the polyacrylates prepared by the inventive process as pressure sensitive adhesives, the polyacrylates are optionally optimized by blending with at least one resin. As tackifying resins for addition, it is possible to use, without exception, all tackifier resins which are already known and are described in the literature. Representatives that may be mentioned include pinene resins, indene resins, and rosins, their disproportionated, hydrogenated, polymerized, esterified derivatives and salts, aliphatic and aromatic hydrocarbon resins, terpene resins and terpene-phenolic resins, and also C5 resins, C9 resins, and other hydrocarbon resins. Any desired combinations of these and further resins can be used in order to set the properties of the resultant adhesive in accordance with what is required. In general, it is possible to use any (soluble) resins that are compatible with the corresponding polyacrylate; in particular, mention may be made of all aliphatic, aromatic, and alkylaromatic hydrocarbon resins, hydrocarbon resins based on simple monomers, hydrogenated hydrocarbon resins, functional hydrocarbon resins, and natural resins. Explicit reference is made to the depiction of the state of knowledge in the "Handbook of Pressure Sensitive Adhesive Technology" by Donatas Satas (van Nostrand, 1989).

In a further advantageous development, the PSA is admixed with one or more plasticizers, such as low molecular weight polyacrylates, phthalates, poly(ethylene glycol)s or poly(ethylene glycol)s functionalized by amino groups, or plasticizer resins. In one preferred further development, phosphates/polyphosphates are used for acrylic hotmelts.

The acrylic hotmelts may further be blended with one or more additives such as aging inhibitors, light stabilizers, ozone protectants, fatty acids, resins, nucleators, expandants, compounding agents and/or accelerators.

They may be further be admixed with one or more fillers such as fibers, carbon black, zinc oxide, titanium dioxide, hollow or solid glass (micro)beads, microbeads made from other materials, silica, silicates and chalk, with the addition of nonblocked isocyanates also being possible.

Especially for use as a PSA it is advantageous for the inventive process if the polyacrylate is applied preferentially from solution as a film to a support or to a backing material.

One advantageous further development of the inventive process comprises concentrating the polyacrylates prepared as described above to give a polyacrylate composition whose solvent content is $\leq 2\%$ by weight. This procedure is preferably conducted in a concentrating extruder. In one advantageous variant of the process, the polyacrylate composition is then applied as a hotmelt composition in the form of a film to a support or to a backing material.

For the two latter variants of the inventive process, preferred backing materials used, for adhesive tapes for example, are the materials customary and familiar to the skilled worker, such as films (polyester, PET, PE, PP, BOPP, PVC), nonwovens, foams, wovens and woven sheets, and also release paper (glassine, HDPE, LDPE). This list is not conclusive.

For PSA use it is particularly advantageous to crosslink the polyacrylates following coating onto the support or onto the backing material. For this purpose, for the production of PSA tapes, the polymers described above are optionally blended with crosslinkers. Crosslinking may advantageously be induced thermally or by means of high-energy radiation, in the latter case in particular by electron beams or, following the addition of appropriate photoinitiators, by ultraviolet radiation.

Preferred radiation-crosslinking substances according to the inventive process include, for example, difunctional or polyfunctional acrylates or difunctional or polyfunctional urethane acrylates, difunctional or polyfunctional isocyanates or difunctional or polyfunctional epoxides. Very advantageously, it is likewise possible to use metal chelate compounds. However, use may also be made here of any other difunctional or polyfunctional compounds that are familiar to the skilled worker and are capable of crosslinking polyacrylates.

Suitable photoinitiators include preferably Norrish type I and type II cleavers, with some possible examples of both classes being benzophenone derivatives, acetophenone derivatives, benzile derivatives, benzoin derivatives, hydroxyalkylphenone derivatives, phenyl cyclohexyl ketone derivatives, anthraquinone derivatives, thioxanthone derivatives, triazine derivatives or fluorenone derivatives, this list making no claim to completeness.

Also claimed is the use of the polyacrylate prepared by the inventive process as a pressure sensitive adhesive.

Particularly advantageous is the use of the polyacrylate PSA, prepared as described, for an adhesive tape, in which case the polyacrylate PSA may be applied to one or both sides of a support.

EXAMPLES

Test Methods

The following test methods were employed to evaluate the adhesive properties and general properties of the PSAs prepared.

180° Bond Strength Test (Test A)

A 20 mm strip of an acrylic PSA applied as a film to polyester was applied to steel plates. The PSA strip was pressed onto the substrate twice using a 2 kg weight. The adhesive tape was then immediately pulled from the substrate at 300 mm/min and at an angle of 180°. The steel plates were washed twice with acetone and once with isopropanol. The results are reported in N/cm and are averaged from three measurements. All measurements were conducted at room temperature.

Shear Strength (Test B)

A 13 mm strip of the adhesive tape was applied to a smooth steel surface which had been cleaned three times with acetone and once with isopropanol. The application area was 20 mm*13 mm (length*width). The adhesive tape was then pressed onto the steel support four times under an applied pressure of 2 kg. At 80° C. a 1 kg weight was affixed to the adhesive tape, at room temperature a 1 kg or 2 kg weight. The measured shear stability times are reported in minutes and correspond to the average of three measurements.

Residual Monomer Content (Test C)

The residual monomer content was determined analytically by liquid extraction of the PSAs used followed by capillary gas chromatography.

Rheology (Test D)

The measurements were carried out using the Dynamic Stress Rheometer instrument from Rheometrics. The frequency range from 0.1 to 100 rad/s was scanned at 25° C.

The temperature sweep was measured at 10 rad/s in a temperature range from −25° C. to 130° C. All experiments were conducted with parallel plate arrangement.

Gel Permeation Chromatography GPC (Test E)

The average molecular weight $M_w$ and polydispersity PD were determined by the following technique: the eluent used was THF containing 0.1% by volume trifluoroacetic acid. Measurement was carried out 25° C. The precolumn used was PSS-SDV, 5μ, $10^3$ Å, ID 8.0 mm×50 mm. Separation was effected using the columns PSS-SDV, 5μ, $10^3$ and also $10^5$ and $10^6$ each of ID 8.0 mm×300 mm. The sample concentration was 4 g/l, the flow rate 1.0 ml per minute. Measurement was made against PMMA standards.

Preparation of the Regulators

Benzyl dithiobenzoate was synthesized in accordance with Houben Weyl, Methoden der Organischen Chemie, 4th Edition, Vol. E5, Part 1, p. 912 and literature cited therein. 13.78 g (85.0 mmol) of CDI and 10.0 g (81.9 mmol) of benzoic acid are stirred in 100 ml of anhydrous DMF at −10° C. for 2 h in the absence of moisture. Then 10 ml (85 mmol) of benzyl mercaptan is added and the mixture is stirred at −10° C. for one hour. Following the addition of 100 ml of ethyl acetate, the mixture is washed with saturated NaCl solution, dried over magnesium sulfate, treated in a rotary evaporator to remove ethyl acetate, and concentrated under reduced pressure. Crystallization gives 11.64 g (62% yield) of colorless needles of the thioester. The thioester is used without further purification for preparing the dithioester.

11.32 g (49.6 mmol) of thioester and 20.37 g (50.36 mmol) of Lawesson's reagent was stirred in 150 ml of anhydrous toluene at 110° C. for 17 h. After the reaction mixture had been left overnight at room temperature, the excess Lawesson's reagent was drawn off with suction and the remaining product was treated in a rotary evaporator to remove toluene. Using the eluent dichloromethane/ petroleum ether (1:1), the dithioester was purified on a separating column packed with silica gel 60 (Merck). Following evaporation of the eluent, 11.79 g of the dithioester were isolated (yield: 97%)

$^1$H-NMR (CDCl$_3$) δ (ppm): 7.94–7.99 (d, 2 H), 7.24–7.49 (m, 8 H), 4.57 (s, 2

The bis-2,2'-phenylethyl thiocarbonate is synthesized starting from 2-phenylethyl bromide with carbon disulfide and sodium hydroxide in accordance with a procedure from Synth. Communications 18(13), pp. 1531–1536, 1988. Yield after distillation: 72%.

$^1$H-NMR (CDCl$_3$) δ (ppm): 7.20–7.40 (m, 10 H), 1.53, 1.59 (2×d, 6 H), 3.71, 3.81 2 H).

Preparation of the Examples

Example 1

A 2 L glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, 150 g of acetone and 0.2 g of benzyl dithiobenzoate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 150 g of acetone. After 24 h and after 36 h, 0.4 g of Perkadox 16™ (Akzo) was added in each case. After a reaction time of 48 h, the polymerization was terminated and the batch cooled to room temperature. The polymer was analyzed by test methods C and E.

Example 2 (Reference)

A 2 L glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, and 150 g of acetone/isopropanol (97:3). Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 150 g of acetone/isopropanol (97:3). After 6 h and after 8 h, 0.4 g of Perkadox 16™ (Akzo) was added in each case. After a reaction time of 12 h, the polymerization was terminated and the batch cooled to room temperature. The polymer was analyzed by test methods C and E.

Example 3 (Reference)

A 2 L glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate and 150 g of acetone. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h the batch gelled and the polymerization was terminated.

Example 4

A 2 L glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, 150 g of acetone and 0.5 g of dodecanethiol. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 150 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 5

A 2 L glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, 150 g of acetone and 0.6 g of ethyl dithioacetate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 150 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 6

A 2 L glass reactor conventional for free-radical polymerizations was charged with 4 g of acrylic acid, 4 g of maleic anhydride, 32 g of N-tert-butylacrylamide, 180 g of 2-ethylhexyl acrylate, 180 g of n-butyl acrylate, 150 g of acetone and 0.4 g of bis-2,2'-phenylethyl thiocarbonate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 150 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 7

A 2 L glass reactor conventional for free-radical polymerizations was charged with 8 g of acrylic acid, 4 g of methyl acrylate, 40 g of N-tert-butylacrylamide, 348 g of 2-ethylhexyl acrylate, 175 g of acetone and 0.2 g of benzyl dithiobenzoate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 175 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 8

A 2 L glass reactor conventional for free-radical polymerizations was charged with 8 g of acrylic acid, 4 g of methyl acrylate, 40 g of N-tert-butylacrylamide, 348 g of 2-ethylhexyl acrylate, 175 g of acetone and 0.5 g of dodecanethiol. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 175 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 9

A 2 L glass reactor conventional for free-radical polymerizations was charged with 12 g of acrylic acid, 194 g of 2-ethylhexyl acrylate, 194 g of n-butyl acrylate, 175 g of acetone and 0.2 g of benzyl dithiobenzoate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 175 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 10

A 2 L glass reactor conventional for free-radical polymerizations was charged with 12 g of acrylic acid, 194 g of 2-ethylhexyl acrylate, 194 g of n-butyl acrylate, 175 g of acetone and 0.5 g of dodecanethiol. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 175 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 11

A 2 L glass reactor conventional for free-radical polymerizations was charged with 8 g of acrylic acid, 32 g of t-butyl acrylate, 360 g of 2-ethylhexyl acrylate, 175 g of acetone and 0.2 g of bis-2,2'-phenylethyl thiocarbonate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 175 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 12

A 2 L glass reactor conventional for free-radical polymerizations was charged with 8 g of acrylic acid, 32 g of t-butyl acrylate, 360 g of 2-ethylhexyl acrylate, 175 g of acetone and 0.5 g of dodecanethiol. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 175 g of acetone. After 24 h and after 36, 0.4 g of Perkadox 16™ (Akzo) was added in each case. After a reaction time of 48 h, the polymerization was terminated and the batch cooled to room temperature. The polymer was analyzed by test methods C and E.

Example 13

A 2 L glass reactor conventional for free-radical polymerizations was charged with 28 g of acrylic acid, 60 g of methyl acrylate, 312 g of 2-ethylhexyl acrylate, 200 g of acetone and 0.2 g of bis-2,2'-phenylethyl thiocarbonate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 200 g of acetone. After 24 h and after 36, 0.4 g of Perkadox 16™ (Akzo) was added in each case. After a reaction time of 48 h, the polymerization was terminated and the batch cooled to room temperature. Then 100 g of the PSA (based on the solids fraction) were mixed with 0.5 part by weight of aluminum triacetylacetonate, applied from solution to a PET support provided with a primer, and dried at 120° C. for 10 minutes. The application rate was 50 g/m². Adhesive properties were subsequently evaluated by test methods A and B.

Example 14

A 2 L glass reactor conventional for free-radical polymerizations was charged with 40 g of acrylic acid, 360 g of 2-ethylhexyl acrylate, 200 g of acetone and 0.2 g of bis-2,2'-phenylethyl thiocarbonate. Nitrogen gas was passed through the reactor with stirring for 45 minutes and then the reactor was heated to 58° C., after which 0.2 g of azoisobutyronitrile (AIBN) was added. After a reaction time of one hour, 0.2 g of Vazo 52™ (DuPont) was added, after 1.30 h 0.4 g of Vazo 52™ and after 2 h 0.6 g of Vazo 52™. After a reaction time of 2.5 h, a further 0.2 g of azoisobutyronitrile (AIBN) was added. After 4 h, the mixture was diluted with 200 g of acetone. After 24 and after 36, 0.4 g of Perkadox 16™ (Akzo) was added in each case. After a reaction time of 48 h, the polymerization was terminated and the batch cooled to room temperature. Then 100 g of the PSA (based on the solids fraction) were mixed with 0.5 part by weight of aluminum triacetylacetonate, applied from solution to a PET support provided with a primer, and dried at 120° C. for 10 minutes. The application rate was 50 g/m². Adhesive properties were subsequently evaluated by test methods A and B.

Results

For the adhesive proving of Examples 1, 2 and 4, 5 and 6, test methods A and B were conducted. The examples were applied from solution to a primed PET support at an application rate which after drying for 10 minutes at 120° C. was 50 g/m². The examples were the crosslinked using EB at different doses and an accelerating voltage of 230 kV (EB unit from Crosslinking).

The results of the polymerizations are listed in Table 1.

TABLE 1

| Example | $M_w$ | PD | Conversion |
| --- | --- | --- | --- |
| 1 | 488,000 | 2.8 | 99.1% |
| 2 | 685,000 | 4.6 | 99.4% |
| 3 | — | — | — |
| 4 | 585,000 | 4.1 | 99.2% |
| 5 | 527,000 | 3.2 | 99.0% |
| 6 | 446,500 | 2.7 | 98.2% |

$M_w$: Average molecular weight (weight average) [g/mol]
PD: Polydispersity

Table 1 demonstrates that polymerization in pure solvent (Example 3) is associated with problems. In order to achieve e a high conversion, a relatively large amount of initiator is needed, in which case the batch is gelled after a reaction time of just 4 h and the polymerization has to be terminated. The polymerizations of Examples 1, 2 and 4 demonstrate that regulators prevent gelling, while high conversions of >98% are still achievable by initiating in a plurality of stages and with a plurality of initiators. Nevertheless, alcohols, such as isopropanol, for example, are of very limited suitability, since this regulator is not incorporated into the PSA and therefore remains in the solvent. For concentration to the hotmelt, it is necessary to distill off a solvent mixture under low pressure. The throughput here is severely reduced as a result of a changing boiling point. Thiols and dithioesters (Examples 1, 4, 5 and 6), on the other hand, are incorporated into the polymer during the polymerization process and do not adversely affect the concentration process. In addition to these criteria, the achievable average molecular weight and the molecular weight distribution (dispersity) are likewise of critical importance to the adhesive properties. Examples 1, 5 and 6 demonstrate that thioesters are the most efficient regulators and thus achieve the lowest polydispersity for the corresponding polyacrylate PSA.

The effect of polydispersity on adhesive properties is shown in Table 2.

TABLE 2

| Example | SST RT 10 N | BS/steel [N/cm] | EB dose [kGy] |
| --- | --- | --- | --- |
| 1 | 4150 | 4.6 | 20 |
| 2 | 840 | 4.5 | 20 |
| 4 | 1070 | 4.7 | 20 |
| 5 | 3170 | 4.6 | 40 |
| 6 | 3950 | 4.8 | 40 |

Application rate: 50 g/m²
SST: Shear stability times [min]
BS: Bond strength on steel
EB: Electron beams The benzyl dithiobenzoate gave the highest shear strength in comparison with the other polymerization regulators. Since the average molecular weight is virtually identical to references 2 and 4, the positive effect of increased cohesion can be attributed to the narrow molecular weight distribution.

Further, Examples 5 and 6 demonstrate that, as a result of thioester regulation, it is possible even at low average molecular weight to prepare acrylic PSAs which, as a result of the narrower molecular weight distribution, still have a greater shear strength than the conventionally regulated Example 2 and 4 with higher average molecular weight.

The use of the regulators of the invention is underpinned below by further examples.

For the adhesive proving of Examples 7–12, test methods A and B were carried out. Examples 7–12 were freed from solvent at elevated temperature and subatmospheric pressure and applied as hotmelts (from the melt) at about 135° C. through a slot die from Pröls to a primed PET backing at an application rate of 50 g/m². The flow viscosity was determined using test method D. The examples were subsequently crosslinked with EB at different doses and an accelerating voltage of 230 kV (EB unit from Crosslinking).

The results of the polymerizations are listed in Table 3.

TABLE 3

| Example | $M_w$ | PD | Conversion |
|---------|---------|-----|------------|
| 7 | 465,000 | 2.7 | 99.3% |
| 8 | 702,000 | 4.8 | 99.4% |
| 9 | 485,000 | 2.9 | 99.2% |
| 10 | 698,000 | 4.7 | 99.4% |
| 11 | 440,000 | 2.8 | 99.3% |
| 12 | 722,000 | 4.7 | 99.2% |

$M_w$: Average molecular weight (weight average) [g/mol]
PD: Polydispersity

Table 3 demonstrates that the significantly lower average degree of polymerization was accompanied by a reduction in the polydispersity of the dithioester-regulated acrylic PSAs to well below that of the thiol-regulated adhesives. It is also possible to use trithiocarbonates as efficient regulators (Example 11). In all reactions, the conversion is over 99% as a result of the different initiation stages with AIBN, Vazo 52™ and Perkadox 16™. For adhesive assessment, the specimens were coated from the melt and the flow viscosity was determined by means of test D. The corresponding results are listed in Table 4:

TABLE 4

| Example | SST (RT, 10 N) | BS/steel [N/cm] | η[Pa * s]at 130° C. and 1 rad/s | EB dose [kGy] |
|---------|----------------|-----------------|----------------------------------|---------------|
| 7 | 8020 | 4.8 | 4800 | 50 |
| 8 | 3565 | 4.9 | 5800 | 50 |
| 9 | 4195 | 4.9 | 3900 | 50 |
| 10 | 1575 | 5.0 | 4900 | 50 |
| 11 | 2350 | 4.7 | 3000 | 40 |
| 12 | 1045 | 4.8 | 4100 | 40 |

Application rate: 50 g/m²
SST: Shear stability times [min]
BS: Bond strength on steel
η: Flow viscosity by test D
EB: Electron beams The flow viscosity is correlated with the polydispersity of the individual polyacrylates. As a result of narrower molecular weight distribution and the lower molecular weight, the flow viscosity falls and, according, the PSAs are much easier to coat from the melt. A further positive feature is that the dithioester- or trithiocarbonate-regulated polymers exhibit greater cohesion test than the thiol-regulated compositions. The bond strengths remain virtually unaffected by the molecular weight distribution.

In the text below, the results of Examples 13 and 14 are evaluated. Table 5 plots the adhesive properties of an acrylic PSA regulated with a trithiocabonate from solution. The specimens were crosslinked thermally with an aluminum chelate. The high cohesion of the adhesives demonstrates that the regulators of the invention are suitable for conventional polyacrylates for coating from solution.

TABLE 5

| Example | SST (RT, 10 N) | BS/steel [N/cm] |
|---------|----------------|-----------------|
| 13 | +10,000 | 3.9 |
| 14 | +10,000 | 3.8 |

Application rate: 50 g/m²
SST: Shear stability times [min]
BS: Bond strength on steel

What is claimed is:

1. A process for preparing polyacrylates, which comprises a preparing a monomer mixture having at least 70% by weight of at least one acrylic monomer of the general formula

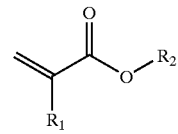

where R1 is H or CH3 and R2 is H or an alkyl chain having 1–20 carbon atoms, polymerizing the mixture in the presence of at least one initial free-radical initiator, by free-radical polymerization with at least one thioester as polymerization regulator, in a reaction solution comprising at least a 50% concentration of said monomer mixture, including said at least one initial free-radical initiator and said at least one thioester.

to form a polyacrylate polymer having an average molecular weight in the range from 250,000 g/mol to 1,000,000 g/mol, and a molecular weight distribution $M_w/M_n$, is of <4, said polymerization is a free-radical polymerization conducted within a temperature range of from 50° C. to 90° C.

said polymerization being reinitiated at least once using a first free-radical polymerization initiator with a grafting activity ϵ<5 at the reaction temperature, optionally, controlling the reaction by diluting the reaction solution according to the viscosity of the polymer, carrying out a controlled reinitiation with up to 2% by weight based on the weight of monomer mixture, of a second initiator with a grafting activity ϵ>10 at the reaction temperature, and conducting the polymerization to a conversion >90%.

2. The process as claimed in claim 1, wherein the thioesters used comprise compounds of the structural formula:

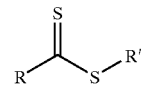

where R and R' are chosen independently of one another and R is a radical selected from one of groups i) to iv) and R' is a radical selected from one of groups i) to iii):

i) $C_1$–$C_{18}$ alkyl $C_2$–$C_{18}$ alkenyl, $C_2$–$C_{18}$ alkynyl, in each case linear or branched; aryl, phenyl, benzyl, aliphatic and aromatic heterocycles, ii) —NH$_2$, —NH—R$^1$, —NR$^1$R$^2$, —NH—C(O)—R$^1$, —NR$^1$—C(O)—R$^2$, —NH—C(S)—R$^1$, —NR$^1$—C(S)—R$^2$,

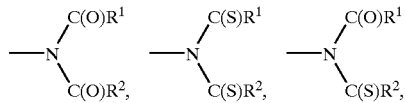

where R$^1$ and R$^2$ are independently chosen radicals from the group i)

iii) —S—R$^3$, —S—C(S)—R$^3$, where R$^3$ is a radical chosen from one of groups i) and ii), iv) —O—R$^3$, —O—C(O)—R$^3$, where R$^2$ is a radical chosen from one of groups i) and ii).

3. The process as claimed in claim 1, wherein said monomer mixture is composed of up to 30%, by weight of one or more vinyl compounds selected from the group consisting of vinyl esters, vinyl halides, vinylidene halides and nitriles of ethylenically unsaturated hydrocarbons.

4. The process as claimed in claim 1, wherein said at least one initial free-radical initiator has a grafting activity ε<5 at the prevailing temperature of the reaction solution or is used in an amount of 0.001–1% by weight on the weight of monomer mixture or has said grafting activity and is used in said amount.

5. The process as claimed in claim 1, wherein said thioester is used in an amount of 0.001%–5%, based on the weight of the monomer mixture, or the molar ratio of free-radical initiator to thioester is in the range of from 50:1 to 1:1, or said thioester is used in said amount and said molar ratio is in said range.

6. The process as claimed in claim 1, comprising a further step of applying said polyacrylates from solution as a film to a support or to a backing material.

7. The process as claimed in claim 1, comprising the further steps of concentrating said polyacrylates to solvent content of ≦2% by weight, and then applying same as a hotmelt composition in a form of a film to a support material or to a backing material.

8. The process as claimed in claim 3 or 4 wherein the polyacrylate film applied to the support or the backing material is crosslinked by thermal treatment.

9. The process of claim 1, wherein said conversion is >95%.

* * * * *

UNITED STATES PATENT AND TRADEMARK OFFICE
CERTIFICATE OF CORRECTION

PATENT NO. : 6,765,078 B2
DATED : July 20, 2004
INVENTOR(S) : Husemann et al.

It is certified that error appears in the above-identified patent and that said Letters Patent is hereby corrected as shown below:

Column 7,
Line 43, "(s, 2" should read -- (S, 2 H). --
Line 50, "3.81 2 H)" should read -- 3.81 (2xm, 2 H). --

Column 13,
Line 54, "falls and, according, the" should read -- falls and, accordingly, the --

Column 14,
Line 38, "is of < 4," should read -- "of < 4, --

Column 15,
Line 16, "where $R^2$ is" should read -- where $R^3$ is --

Column 16,
Line 1, "by weight on the" should read -- by weight, based on the --

Signed and Sealed this

First Day of February, 2005

JON W. DUDAS
*Director of the United States Patent and Trademark Office*